July 19, 1966  R. A. MUIRHEAD  3,261,447
ARTICLE SPACER MECHANISM FOR CONVEYORS
Filed April 9, 1964  2 Sheets-Sheet 2
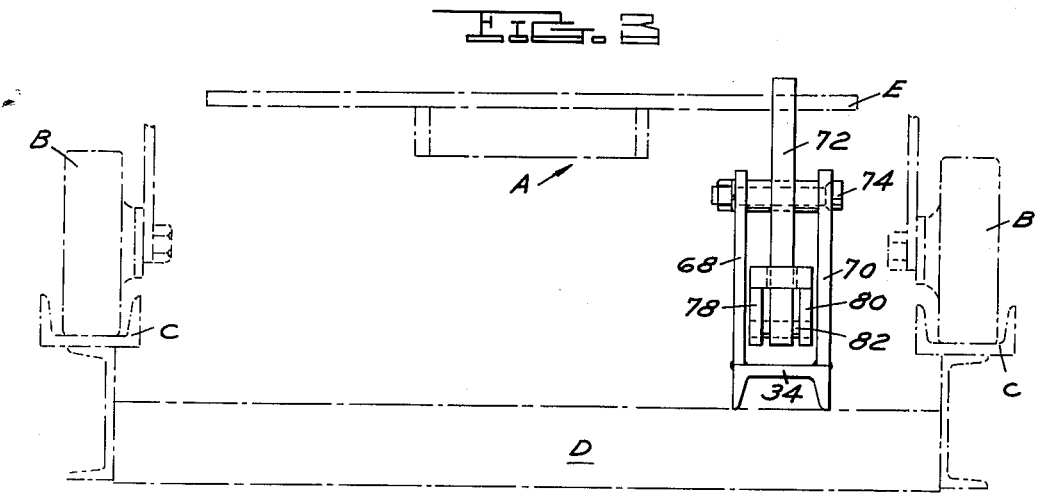
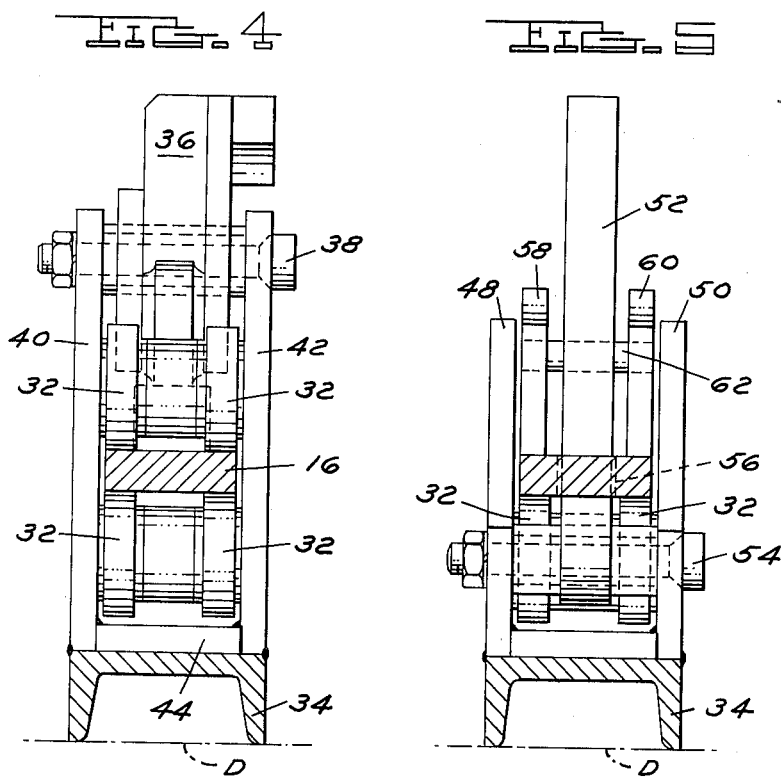
INVENTOR.
RAYMOND A. MUIRHEAD
BY
Burton & Parker
ATTORNEYS

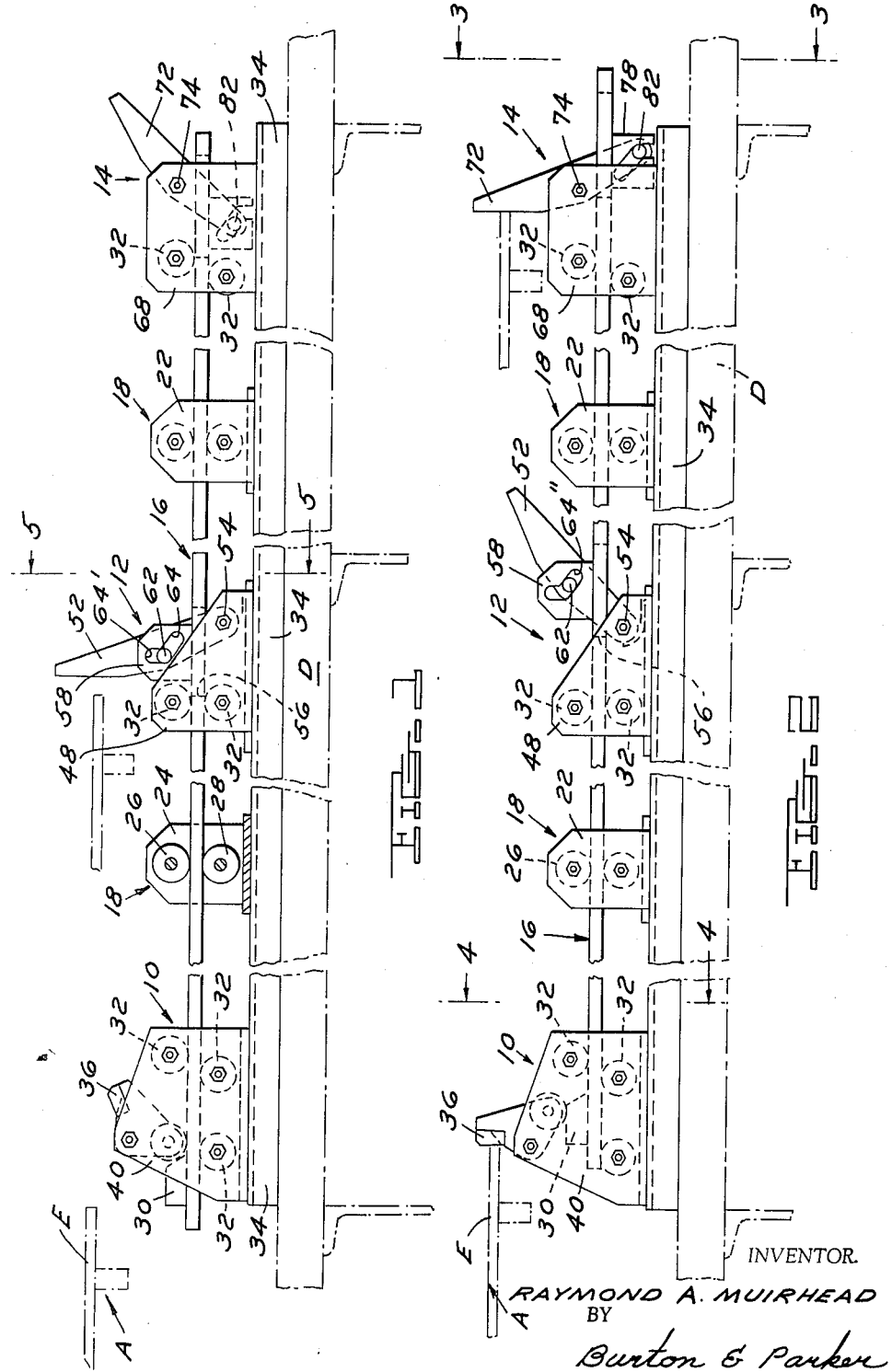

United States Patent Office 3,261,447
Patented July 19, 1966

3,261,447
ARTICLE SPACER MECHANISM FOR CONVEYORS
Raymond A. Muirhead, Detroit, Mich., assignor to Taylor & Gaskin, Inc., Detroit, Mich., a corporation of Michigan
Filed Apr. 9, 1964, Ser. No. 358,454
7 Claims. (Cl. 198—34)

This invention relates to conveyors, and in particular to apparatus for uniformly spacing articles apart along a conveyor line.

A general object is the provision of article spacing apparatus for uniformly spacing articles apart which apparatus comprises simple mechanisms adapted to be actuated by the moving articles themselves, eliminating any necessity for complicated control circuits or the like to govern the operation of the apparatus.

Another object is the provision of article spacing apparatus of the character described comprising a stop means mounted for movement between article stop and article release positions, a reset mechanism and a release mechanism positioned successively further downstream of the stop means and operably coupled thereto, with the reset and release mechanisms each being responsive to an oncoming article to shift the stop means respectively between its article stop and release positions.

Other objects, advantages and meritorious features will more fully appear from the following specification, claims and accompanying drawings, wherein:

FIG. 1 is a side elevational view of article spacing apparatus embodying the invention showing the stop means in article release position;

FIG. 2 is a side elevational view similar to FIG. 1 showing the stop means in its article stop position;

FIG. 3 is a cross-sectional view taken along line 3—3 of FIG. 2 showing the article release mechanism;

FIG. 4 is a cross-sectional view taken along line 4—4 of FIG. 2 showing the stop means; and FIG. 5 is a cross-sectional view taken along line 5—5 of FIG. 1 showing the reset mechanism.

While the drawings and the following description relates specifically to a conveyor line such as in an automobile assembly plant or the like along which are conveyed automobile or truck bodies, it is to be understood that the invention does not concern itself with the conveyor system per se or the type of articles being conveyed, but on the other hand relates specifically to a system or apparatus for spacing articles uniformly apart along a conveyor line. In the illustrated embodiment, the apparatus of the invention is disposed intermediate two conveyors in effect. The upstream conveyor might be properly characterized as an accumulating conveyor, in that the articles such as automobile bodies, are carried along the conveyor by some power-driven means, which means is so designed that the articles may accumulate in end-to-end abutting relationship against a stop or the like at the downstream end of the conveyor while the conveyor continues running. Such a conveyor is well known in the prior art, and generally includes a spring loaded member normally engaging an article to move it along the conveyor, which member is automatically disengaged from the article when the movement of the latter is interrupted. The conveyor extending downstream from the article spacing apparatus is preferably of a character to positively drive each of the articles and thus maintain the desired spaced relationship therebetween.

Referring first to FIG. 3, the articles A being conveyed are shown as having wheels B which roll along the conveyor line within channel-like members C supported in any convenient fashion as on a base D. Each of the articles A being conveyed exhibits a portion E which actuates the various movable members of the spacing apparatus as described hereinbelow. In the case of automobile bodies or the like, the member designated by the letter E would be a portion of the body undercarriage.

Referring now to FIGS. 1 and 2, the article spacing apparatus comprises in general three essential portions, namely the stop means 10, the reset mechanism 12, and the release mechanism 14. Briefly, the stop means is mounted for movement between a position permitting article movement thereover and a position interrupting article movement along the conveyor. Such positions may be referred to as article stop and article release positions. The reset mechanism 12 is adapted to be contacted and shifted by a moving article to raise the stop means into its article stop position, and the release mechanism 14 is likewise adapted to be contacted and shifted by an article to shift the stop means to its article release position. The movement of conveyed articles having portions E in FIGS. 1 and 2 is from left to right in those two figures.

Extending the entire length of the apparatus is a shift bar or the like 16 which is supported for limited reciprocable movement at spaced intervals in guide assemblies 18. Each guide assembly 18 comprises essentially a base 20 and upstanding supports 22 and 24 between which are journaled upper and lower rollers 26 and 28 which support and guide the shift bar 16 as shown in FIGS. 1 and 2. The shift bar 16 is preferably an elongate bar made out of steel or the like which is rectangular in cross section, and which is provided adjacent its upstream end with a cam block or the like 30 engageable with the stop member to govern the movement of the latter upon reciprocation of the shift bar 16.

As can be seen from the various figures of the drawings, each of the units 10, 12 and 14 are provided with rollers 32 which support the shift bar 16 for movement similarly to the rollers 26 and 28 in the guide assemblies 18. All of the elements are suitably supported as by being welded to an inverted channel member 34 which is in turn supported upon the base D. As shown in FIGS. 1, 2 and 4, the stop means 10 includes a stop member 36 mounted for pivotal movement upon a shaft 38 which is supported in a bracket-like structure comprising side members 40 and 42 and base member 44 (see FIG. 4) which may be welded together and to member 34 as shown. The stop member 36 is of such a configuration that it will pivot by gravity about its axis 38 to its position shown in FIG. 1. Member 36 also carries a rotatable roller 46 contacting the cam block 30 on shift bar 16 as more fully described hereinbelow.

The reset mechanism 12 comprises two upstanding brackets 48 and 50 welded to member 34 and supporting a generally upstanding rigid arm 52 upon a pivot shaft 54 extending between the two brackets. Bar 16 is provided with a cut-out as at 56 through which arm 52 extends, and secured to the bar as by welding are a pair of upstanding ears 58 and 60. Arm 52 carries a pin or the like 62 projecting beyond opposite sides thereof through suitable slots 64 in the brackets 58 and 60.

The details of construction of the release mechanism 14 are quite similar to the reset mechanism 12 in that there are provided similar upstanding brackets 68 and 70 welded to member 34 and an arm 72 pivotally supported on the brackets by a shaft 74. Secured to bar 16, apertured as at 76 to accommodate arm 72, are a pair of depending ears 78 and 80. A pin 82 projecting from arm 72 beyond opposite sides thereof engages the slots 84 in each of the ears 78 and 80 as shown in FIGS. 1 and 2. It will be noted that the essential difference between the reset mechanism 12 and the release mechanism 14 is in the relative positions between their respective pivot shafts 54 and 74, and the location of the ears and pins with respect to the shift bar 16.

Referring to FIGS. 1 and 2, arm 52 of reset mechanism 12 is adapted to be shifted from the position shown in FIG. 1 to the position shown in FIG. 2 by the moving article E as follows. As the article E strikes the arm 52, the arm pivots about the stationary pivot 54 carrying with it pin 62 and through it, the ears 58 and 60 which are in turn welded to the shift bar 16. Thus movement of the arm 52 in a clockwise direction from its position of FIG. 1 to its position of FIG. 2 shifts the bar 16 to the right as shown in these two figures. Movement of the arm 52 to its position in FIG. 2 allows the article being conveyed to pass over the arm 52 and continue its movement along the conveyor.

As for the release mechanism 14, movement of its arm 72 in a clockwise direction, or from the position shown in FIG. 2 to the position of FIG. 1, shifts the bar 16 from the right to the left as shown in the two figures. This movement occurs because of the positioning of the stationary pivot 74 for the arm 72 above the bar 16, and the point of interconnection of pin 82 with ears 78 and 80 below the bar, which is the opposite arrangement to that shown for the reset mechanism 12. Therefore, by reference to FIGS. 1 and 2 it can be seen that clockwise movement of reset mechanism arm 52 will shift the bar 16 to the right, while similar clockwise movement of the release mechanism arm 72 will shift the bar to the left. Also, it will be apparent that movement of the shift bar 16 to the right-hand position will also move its associated cam block 30 to the right, causing roller 38 of the stop means 10 to ride up on the cam block 30, shifting the stop member 36 upwardly into the path of an approaching article E to stop article movement along the conveyor; that is the stop member 36 will be shifted from its position of FIG. 1 to its position of FIG. 2. On the other hand, movement of shift bar 16 to the left carries the cam block 30 out of engagement with roller 38, permitting the stop member 36 to pivot under the force of gravity from its stop position shown in FIG. 2 to its release position shown in FIG. 1.

The operation of the apparatus to provide uniform spacing of articles is as follows: As the first article in a line approaches the apparatus, the mechanisms 10, 12 and 14 will be in the position shown in FIG. 1, and the first article will therefore by-pass the stop member 10, as stop 36 is in its article release position, and such article will continue its movement until it strikes arm 52 of reset mechanism 12. Arm 52 will be shifted by the lead article from its position shown in FIG. 1 to that shown in FIG. 2 by the moving article E, and such movement will shift the bar 16 to the right causing stop member 36 to be shifted into its article stop position by cam block 30. Thus the second and following articles approaching along the line will be arrested in their movement by stop member 36 due to the shifting of arm 52 by the leading article in the line.

As the leading article approaches release mechanism 14, the various parts of the apparatus are positioned as shown in FIG. 2, with the next article being held by stop member 36. As arm 72 is shifted clockwise by the article E, the shift bar 16 is moved to the left, releasing stop member 36 from engagement with cam block 30, and allowing the member 36 to pivot to its article releasing or down position and permitting the next article to continue its movement along the conveyor line. As can be seen from the drawings, the interconnection between respective mechanisms 12 and 14 and the bar 16 accomplishes movement of one of the mechanism's arms in a counterclockwise direction while the other of the arms is being shifted by an article in the clockwise direction. Thus as arm 52 is shifted by an article E in the clockwise direction, the attendant movement of bar 16 to the right shifts arm 72 in a counterclockwise direction. Likewise, clockwise movement of arm 72 under the influence of an article E moving along the line results in the counterclockwise movement of arm 52.

Each of the assemblies 12 and 14 are equipped with what is commonly referred to as an "overtravel" feature. That is, the arms 52 and 72 which are contacted and shifted by the approaching articles are so mounted that they can travel past the normal point at which the article would pass over the arm. For instance, as the arm 52 moves from its FIG. 1 to its FIG. 2 position, pin 62 will shift within slot 64 as shown, i.e., the pin will move relative to the slot and within the vertical portion 64' of the slot. When the arm 52 reaches the position of FIG. 2, the article E should pass thereover. However, if the article is lower than normal, it will continue to push arm 52 downwardly (clockwise) and this additional arm movement or overtravel is permitted by the portion of slot 64 indicated at 64'' in FIG. 2. The same is true of the movement of arm 72 of mechanism 14, as can be seen from an examination of FIGS. 1 and 2.

What is claimed is:

1. Apparatus for uniformly spacing apart articles moving along a conveyor line comprising, in combination: a stop member mounted for movement between an article stop position and an article release position; a release mechanism positioned downstream of said stop member a predetermined distance including a part adapted to be movably contacted by an approaching article in said line; an actuating member extending between and operably coupled to said release mechanism and said stop member responsive to movement of said release mechanism part to shift said stop member to article release position; and reset mechanism disposed intermediate said stop member and said release mechanism having a part adapted to be movably contacted by an approaching article in said line and coupled to said actuating member, with said actuating member additionally responsive to movement of said reset mechanism part to shift said stop member to its article stop position.

2. The invention as defined in claim 1 characterized in that said actuating member includes a locking portion engaging said stop member when in article stop position to retain the stop member thereat, said locking portion shiftable to permit movement of the stop member upon actuation of said release mechanism part.

3. Article spacing apparatus for uniformly spacing articles moving along a conveyor line comprising, in combination: a stop member mounted adjacent said line for movement between an article stop position and an article release position; release mechanism spaced downstream from the stop member a predetermined distance; reset mechanism positioned intermediate said stop member and said release mechanism; an actuating member for shifting said stop member between said stop and release positions extending between said stop member and said release mechanism, with said release mechanism and said reset mechanism each coupled to said actuating member and each including a part adapted to be movably contacted by an approaching article for shifting said member, movement of said reset mechanism part operable to shift said stop member to its article stop position and movement of said release mechanism part operable to shift the stop member to its article release position whereby said articles are spaced apart a distance substantially equal to the distance between said stop member and said release mechanism.

4. In apparatus for uniformly spacing moving articles apart along a conveyor line having a stop member pivotally supported for movement between an article stop position and an article release position, means for selectively shifting said stop member between said positions comprising, in combination: an elongate actuating member extending along the conveyor line and supported for limited reciprocable movement longitudinally thereof and having a portion selectively engageable with said stop member to shift the latter to said article stop position; release mechanism coupled to said elongate member adjacent the downstream end thereof having a pivotally mounted part positioned to be shifted by an article shifting the elongate member to a position disengaging said portion of the member from said stop member; and reset mechanism positioned in between said stop member and said release mechanism coupled to said elongate member and having a pivotally mounted part positioned to be shifted by an article for shifting the elongate member to its position disposing said portion thereof in engagement with the stop member to shift the latter to said article stop position.

5. The invention as defined in claim 4 characterized in that said portion of the elongate member comprises a cam block having a substantially flat surface engaging said stop member when in said article stop position to lock the stop member in such position.

6. In apparatus for uniformly spacing apart articles moving along a conveyor line including a stop member shiftable between article stop and article release positions, means for shifting said stop member comprising, in combination: a rigid elongate shift bar extending along the line for limited reciprocable movement longitudinally thereof having an upstream end provided with a cam block engageable with said stop member to shift the same to its article stop position and a downstream end; release mechanism supported adjacent the downstream end of said bar and having a pivotally mounted arm operatively coupled to said bar and positioned to be shifted by an oncoming article to move said bar to a position disengaging said cam block from the stop member; and a reset mechanism supported intermediate the ends of said bar having a pivotally mounted arm coupled to said bar and positioned to be shifted by an oncoming article to move said bar to its position engaging the cam block with the stop member thereby pivoting the stop member to its article stop position.

7. Apparatus for spacing moving articles uniformly apart along a conveyor line comprising, in combination: an elongate rigid shift bar supported for limited reciprocable movement longitudinally of the line of articles, said bar having an upstanding cam block adjacent the upstream end thereof; a stop member pivotally mounted on a horizontal axis substantially above said upstream end of the shift bar for selective movement between article stop and article release positions and normally positioned pivoted downwardly into said article release position; release mechanism spaced a predetermined distance downstream from said stop member coupled to said bar and including a pivotally mounted arm adapted to be shifted by an oncoming moving article to move said shift bar disengaging said cam block from the stop member; and reset mechanism spaced between said stop member and said release mechanism coupled to said bar and having a pivotally mounted arm adapted to be shifted by an approaching moving article to move said shift bar engaging said cam block with the stop member pivoting the stop member into its article stop position.

References Cited by the Examiner

UNITED STATES PATENTS 3,024,890   3/1962   Belk _____ 198—34

EVON C. BLUNK, *Primary Examiner.*

EDWARD A. SROKA, *Examiner.*